Figure 1:
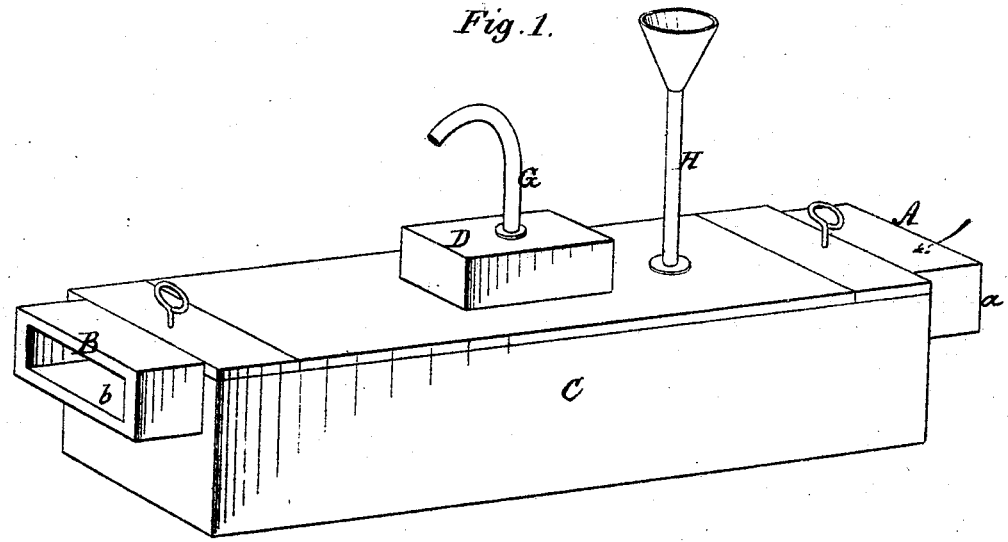

W. H. ANDERSON.
Improvement in Oil Trap for Sewers, &c.

No. 123,663. Patented Feb. 13, 1872.

Witnesses
Phil. F. Synner
F. Jackson

Inventor:
William H. Anderson
By Mc C. Wood
Attorney

UNITED STATES PATENT OFFICE.

WILLIAM H. ANDERSON, OF GREENPOINT, NEW YORK.

IMPROVEMENT IN OIL-TRAPS FOR SEWERS, &c.

Specification forming part of Letters Patent No. 123,663, dated February 13, 1872.

*To all whom it may concern:*

Be it known that I, WILLIAM H. ANDERSON, of Greenpoint, in the county of Kings and State of New York, have invented a certain new and useful Oil-Trap for Sewers, which is particularly applicable to the sewers of oil-works, refineries, gas-works, &c.

My invention consists in a novel apparatus for separating, recovering, and saving oils and other greasy matters from waste-water, heretofore lost by being discharged into the main sewers or streams; and I do hereby declare that the following specification, taken in connection with the drawing furnished and forming a part of the same, is a true, clear, and exact description of the same.

Figure 2:
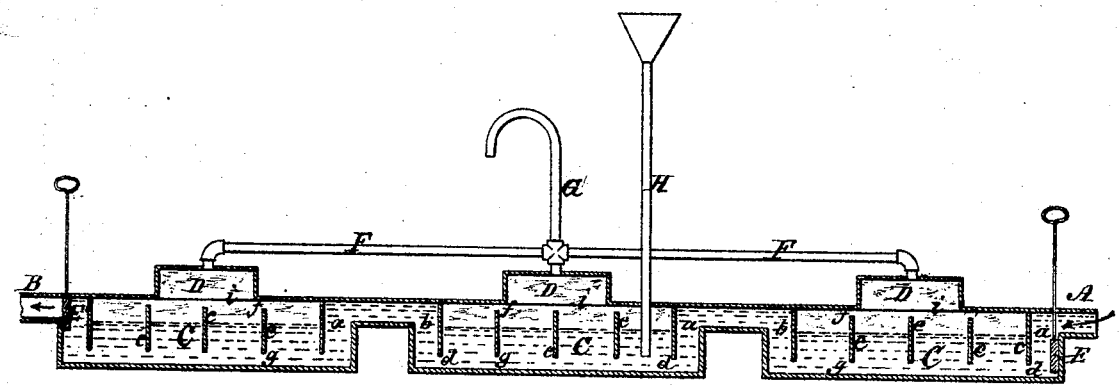

Referring to the drawing, Figure 1 represents one of my oil-traps in perspective. Fig. 2 represents three of the same in longitudinal vertical section.

A represents the discharge-pipe, through which waste water, more or less charged with oil, is intended to flow on its way to the main sewer in the direction of the arrow. D represents the waste-pipe, through which the waste water flows to the main sewer after having parted with its oil in passing through the trap. C represents my trap. It is a rectangular spout-like structure, having its ends extending from the bottom nearly to the top, leaving an opening, *a* and *b*, at each end near the top, through which the waste water is inducted and discharged respectively. Extending from the top downward, near each end of the interior of the trap, are two partitions, *c*, which extend nearly to the bottom, and having openings below, designated as *d* in the drawing. At regular intervals between the two partitions *c* are several other vertical partitions, *e*, which extend neither to the top nor the bottom, leaving an upper opening, *f*, and a lower opening, *g*, at each partition. D represents the oil-reservoir, which is mounted on the top of each trap. It communicates with the interior of the body of the trap by means of suitable openings, *i*.

In the drawing three of my traps are exhibited as connected end to end in a line in such a manner that waste water passing through all of them will leave a portion of its greasy matter or oil in each, thereby practically preventing any waste. At each end of every trap, when single ones are employed, or at the entrance to the first and at the exit-port of the last, when more than one are used in conjunction, a suitable gate or valve is employed by which the entrance or delivery of sewage may be cut off when desired. These valves are shown in the drawing, and designated as E and E'. When several of these traps are employed in conjunction their reservoirs, D, should be connected by a pipe, F, and provided with an oil-pipe, G, for discharging the recovered oily matter. As oil separates from water less readily when the water is very cold, it is desirable that the traps be placed sufficiently low in the ground to secure as uniform temperature as may be practicable during the winter. It is also desirable that the traps be placed at as low a point as possible between the works and the entrance to the main sewer or the stream into which the sewage flows, in order that a proper head of water may be secured for the delivery of oil from the reservoirs, which can readily be accomplished by closing the lower gate or valve E' and opening the upper gate and permitting the head of water to force the oil through the connecting and delivery-pipes to the surface and into any receptacle provided therefor. When it is impracticable to secure sufficient head of water to secure the ready delivery of oil when desired, it can be accomplished by the use of the stand-pipe H, into which water may be poured until the oil has been all forced out of the reservoirs.

If my improved trap should be employed by gas and other similar works which discharge oily or greasy matters into sewers, the matter saved would be found to possess considerable value, and at the same time prevent the streams into which the sewers empty from becoming fouled by the presence of such matter.

Having thus described my invention, I claim as new, and desire to secure by Letters Patent—

1. The close trap C, provided with apertures *a* and *b* for the induction and eduction of sewage, and the partitions *c* and *e* for collecting the oil and other greasy matters therefrom, as and for the purposes specified.

2. In combination with the oil-trap, the induction-pipe E, arranged to cause a pressure of water when desired for effecting the discharge of oil from the trap, substantially as shown and described.

3. In combination with the oil-reservoir of an oil-trap, the stand-pipe H, as and for the purposes specified.

WILLIAM H. ANDERSON.

Witnesses:
FREDERICK ANDERSON,
MARCUS SACKETT.